2,737,480

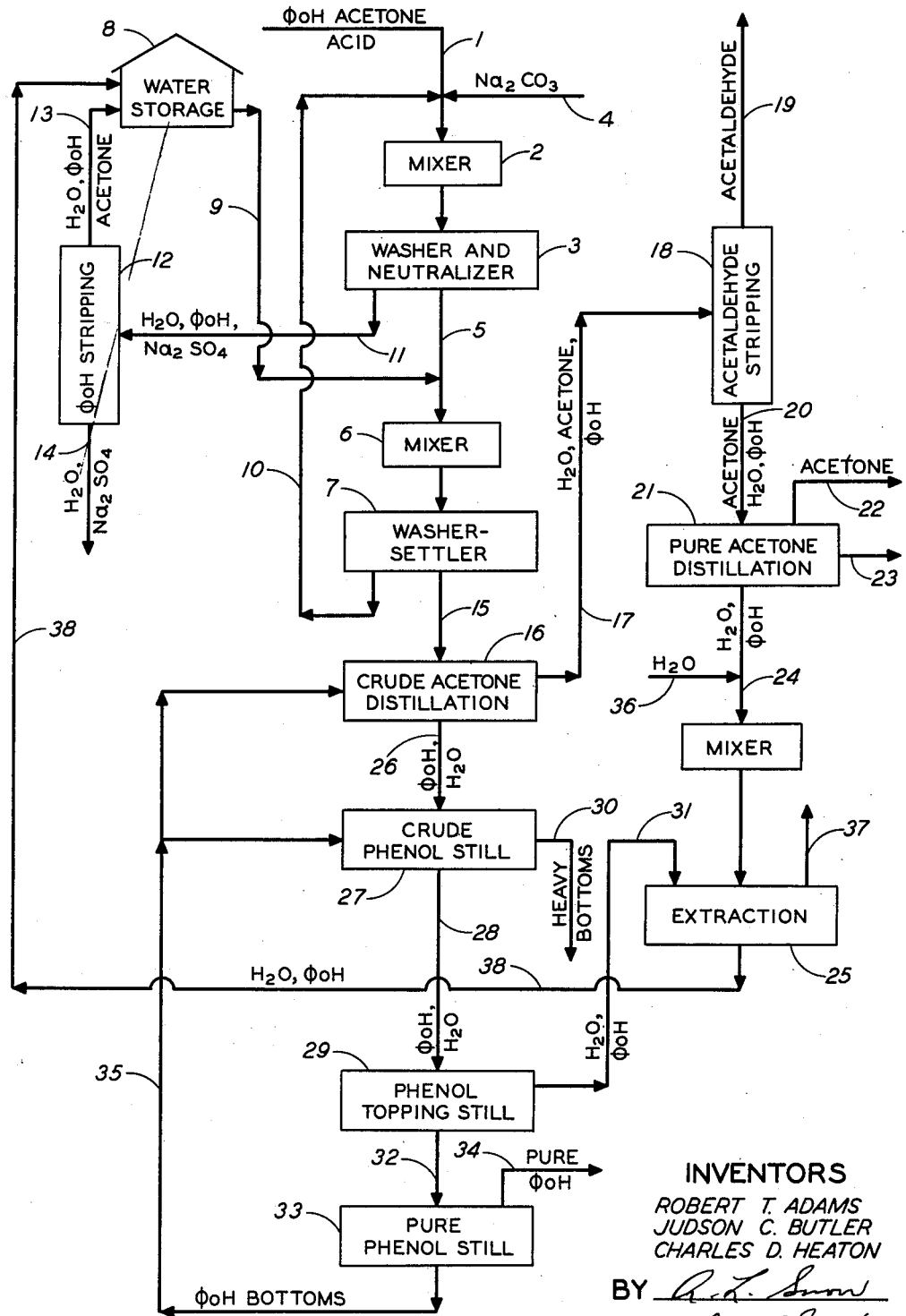

RECOVERY OF ACETONE AND PHENOL FROM CUMENE HYDROPEROXIDE DECOMPOSITION PRODUCT

Robert T. Adams, Walnut Creek, and Judson C. Butler and Charles D. Heaton, El Cerrito, Calif., assignors to California Research Corporation, San Francisco, Calif., a corporation of Delaware Application October 14, 1954, Serial No. 462,146

3 Claims. (Cl. 202—39)

This invention relates to an improved method for recovering substantially pure phenol and acetone from the crude reaction product obtained by decomposing cumene hydroperoxide in the presence of an acid catalyst and is a continuation-in-part of copending application Serial No. 281,212, filed April 8, 1952.

A recently developed process provides a means for manufacturing phenol and acetone from cumene. In the practice of the process cumene is oxidized in liquid phase with a free oxygen-containing gas, usually air, at temperatures from about 195 to 240° F. in the presence of an alkaline material to stabilize the hydroperoxide product. The oxidation reaction product consists predominantly of cumene and cumene hydroperoxide; ordinarily, it has a cumene hydroperoxide content in the range from about 25 to 35% by weight, and contains minor amounts of impurities and side reaction products including dimethylphenyl carbinol, acetophenone, alpho-methyl styrene, cumyl phenol, and salts of lower aliphatic acids. Substantially all of the unreacted cumene is removed from the crude oxidation reaction product by vacuum distillation to produce a cumene hydroperoxide concentrate substantially free of cumene and having a cumene hydroperoxide content of about 90% by weight. The cumene hydroperoxide concentrate is then contacted with a small amount of a strong acid catalyst at temperatures in the range from about 150 to 350° F. to cause cleavage of the cumene hydroperoxide molecules forming phenol and acetone. The cumene hydroperoxide decomposition is desirably conducted in the presence of a volatile inert diluent, conveniently acetone, which is refluxed during the decomposition step to facilitate temperature control, since the decomposition reaction is exothermic. The decomposition reaction product contains many phenol and acetone and a minor proportion of organic by-products including acetophenone, dimethylphenyl carbinol, alpha-methyl styrene, cumyl phenol, acetaldehyde, mesityl oxide, some higher boiling apparently polymeric materials, the acid catalyst, and organic acidic contaminants formed during the oxidation step and/or during the cumene hydroperxide decomposition step. Sulphuric acid is ordinarily employed to catalyze the decomposition of cumene hydroperoxide, but other acids such as formic acid, phosphoric acid, para-toluene sulfonic acid, and the like, may be employed for this purpose.

When the cumene hydroperoxide decomposition is complete, the acid catalyst is neutralized with any convenient basic material such as sodium hydroxide, sodium carbonate, sodium phenolate, and the like. The neutralized decomposition reaction mixture contains the desired phenol and acetone products in a complex mixture which includes not only the organic impurities of the character indicated above, but also the salts produced during neutralization of the cleavage product. Economic recovery of phenol and acetone at purities meeting commercial specifications from such mixtures is no simple matter. Attempts to remove the salts formed during neutralization by filtration are only partially successful, and ordinarily about 25% of the total salt contained in the crude product remains in the filtrate. When such a salt-containing filtrate is subjected to fractional distillation to separate the individual organic components of the mixture, the salts tend to crystallize, plugging transfer lines and fouling heat exchangers and reboilers. Further, if the salt removal is incomplete, as it necessarily is following filtration, sodium carboxylates contained in the filtrate decompose during distillation, causing serious corrosion of distillation equipment. While most of the organic impurities contained in the cumene hydroperoxide decomposition product can be separated by fractional distillation, hydrocarbon oils, such as alpha-methyl-styrene, which boil close to the boiling point of phenol, and mesityl oxide, especially the latter, are extremely difficult to separate.

It has now been found that the difficulties inherent in the recovery of substantially pure phenol and substantially pure acetone from the cumene hydroperoxide decomposition reaction mixture can be expeditiously and inexpensively met by adding a substantial quantity of water to the cumene hydroperoxide decomposition mixture, settling the resultant mixture to separate an organic phase and an aqueous phase, and subjecting both phases to fractional distillation.

In a preferred embodiment of the invention, the cumene hydroperoxide decomposition product is intimately mixed with 0.25 to 3 times its weight of water, and the acid catalyst is neutralized in a washing and neutralization zone. The neutral mixture is settled to separate a water phase and an organic phase. The water phase is fractionally distilled to separate an overhead fraction consisting predominantly of water and containing minor proportions of phenol and acetone and a bottoms fraction consisting essentially of water containing in solution salts formed during neutralization. The overhead fraction is returned to the washing and neutralizing zone and the bottoms fraction is discarded. The organic phase is fractionally distilled to separate an overhead fraction consisting predominantly of acetone and having a substantial content of water and a bottoms fraction consisting predominantly of phenol. The latter overhead fraction is distilled to separate a further overhead fraction consisting of essentially pure acetone and a bottoms fraction consisting predominantly of water and containing a minor proportion of phenol. This bottoms fraction is mixed with fresh water and the mixture is settled to separate an upper organic phase and a lower aqueous phase containing dissolved phenol and the aqueous phase is returned to the washing and neutralizing zone.

The appended drawing is a block flow diagram illustrating a process flow suitable for the practice of the invention. In a representative operation of the process, a cumene hydroperoxide decomposition product containing .2% by weight of acetaldehyde, 45.5% by weight of acetone, 1.4% by weight of water, 38% by weight of phenol, 1.25% by weight of mesityl oxide, less than 1% by weight of cumene, .6% by weight of sulfuric acid, and the remainder, hydrocarbons including alpha-methyl styrene, dimethylphenyl carbinol, acetophenone, cumyl phenol and higher boiling materials, is passed through line 1 and mixer 2 into washing and neutralizing zone 3. Water containing sufficient sodium carbonate to neutralize the sulfuric acid contained in the decomposition mixture is passed through line 4 into line 1. An upper organic phase and a lower aqueous phase are separated in washer and neutralizer 3. The organic phase is passed through line 5 and mixer 6 into washer 7. Additional water is passed from storage tank 8 through line 9 into line 5 and thence into washer 7. The resultant mixture in washer 7 is settled to separate an upper organic phase and a lower aqueous phase. The aqueous phase is passed through line 10 into line 1. The aqueous phase formed in washer and neutralizer 3 is withdrawn through line 11 and passed into still 12. In still 12 an overhead fraction comprising water and substantially all of the phenol and acetone contained in the aqueous phase is removed overhead through line 13 and passed into water storage tank 8. A bottoms fraction comprising water substantially free of organic material and containing dissolved sodium sulfate is removed through line 14. The organic phase formed in washer 7 is withdrawn through line 15 and passed into distillation zone 16 in which it is fractionally distilled to separate an overhead fraction containing water, a minor proportion of phenol and substantially all of the acetone contained in the organic phase which is removed overhead through line 17 and passed into stripping zone 18. In stripping zone 18 a minor overhead fraction containing substantially all of the acetaldehyde contained in the feed is removed through line 19. The bottoms fraction from stripping zone 18 comprising acetone, water and minor proportions of phenol and mesityl oxide is withdrawn from stripping zone 18 through line 20 and passed into acetone still 21. Dry acetone is removed overhead from still 21 through line 22. A second overhead fraction consisting essentially of acetone, but containing from 0.5 to 5% water, is removed from distillation zone 21 through line 23. The bottoms fraction from distillation zone 21 comprising water, phenol and mesityl oxide is withdrawn through line 24 and passed into extraction zone 25. The bottoms fraction from distillation zone 16 comprising phenol, water and organic impurities is removed through line 26 and passed into distillation zone 27. In distillation zone 27 an overhead fraction comprising phenol, water and minor proportions of organic impurities is removed through line 28 and passed into distillation zone 29. A heavy bottoms fraction comprising higher boiling organic materials and a minor proportion of phenol is removed from distillation zone 27 through line 30. This bottoms fraction may be extracted with caustic, if desired, to recover phenol. In distillation zone 29 a minor low boiling overhead fraction comprising water, hydrocarbon impurities is removed and passed through line 31 into extraction zone 25. A bottoms fraction separated in distillation zone 29 is passed through line 32 into distillation zone 33. Substantially pure phenol is recovered as the overhead fraction in distillation zone 33 through line 34. A minor bottoms fraction is separated in distillation zone 33 and passed through line 35 into either distillation zone 16 or distillation zone 27, as desired. Fresh water is introduced into extraction zone 25 through line 36 into line 24 and then into extraction zone 25. The mixture in extraction zone 25 is settled to separate an upper organic phase consisting mainly of organic impurities and containing a minor proportion of phenol which is removed through line 37. A lower aqueous phase formed in extraction zone 25 consisting principally of water containing dissolved phenol is removed through line 38 and passed into water storage tank 8.

Pursuant to the operation in the manner above described, substantially complete recovery of the phenol and acetone contained in the cumene hydroperoxide decomposition mixture is accomplished and both products are recovered at high purities and meet the most rigorous commercial specifications. The only waste water discharged from the system is the water containing dissolved salt which is discharged through line 14; this water is substantially completely free of phenol and presents no disposal problem. Products recovered other than specification phenol and specification acetone are the heavy bottoms fraction removed from distillation zone 27 through line 30, the organic phase removed from extraction zone 25 through line 37, the minor acetaldehyde fraction removed from acetaldehyde stripper 18 through line 19 and the wet acetone stream removed from distillation zone 21 through line 23. The bottoms fraction recovered at line 30 and the organic fraction recovered at line 37 may be processed for recovery of phenol and organic by-products, if desired, or they may be burned. The minor acetaldehyde stream recovered at line 19 can be processed for the recovery of acetaldehyde, if desired, or used as fuel. The wet acetone stream recovered through line 23 is desirably employed as the inert diluent in the cumene hydroperoxide decomposition reaction, but may be subjected to further fractional distillation for the recovery of specification acetone, if desired.

The employment of the above-described water system in the separation of the crude cumene hydroperoxide decomposition product effectively removes all salts produced during neutralization of the decomposition mixture and eliminates the problems which attend any attempt to subject the salt-containing product to fractional distillation. The substantial water content of the feed to distillation zone 16 permits substantially complete removal of the difficultly separable mesityl oxide impurity in the overhead from that distillation zone. Further, the employment of water in the manner described permits substantially complete removal of hydrocarbon impurities boiling close to the boiling point of phenol in the overheads from distillation zones 16 and 29. Substantially complete removal of these hydrocarbon materials is required if specification grade phenol is to be produced.

The process described above has been studied in large scale operation over an extended period. It has been found that dilution of the cumene hydroperoxide decomposition mixture with from 2.5 to about 3.0 times its weight of water followed by processing in the manner described above permits substantially complete recovery of the phenol and acetone contained in the mixture at specification purity. Representative compositions of significant streams in the process flow described above are shown in the following Table I.

TABLE I
Composition per cent by weight

| | $H_2O$ | Phenol | Acetone | Acetaldehyde | Acetophenone | Cumene | Mesityl Oxide | α Methyl Styrene | Carbinol | Cumyl Phenol | $H_2SO_4$ | Salt | Heavier |
|---|---|---|---|---|---|---|---|---|---|---|---|---|---|
| Line 1 | 1.4 | 38 | 45 | 0.2 | 1.6 | .9 | 1.25 | 3.5 | 1.8 | 3.2 | 0.6 | | 1.6 |
| Line 9 | 88 | 3.3 | 8.7 | | | | | | | | | | |
| Line 11 | 85 | 2 | 7.9 | | | | | | | | | 5.0 | |
| Line 13 | 83 | 3.3 | 13.5 | | | | | | | | | | |
| Line 14 | 87 | | | | | | | | | | | 13.0 | |
| Line 15 | 17.3 | 35 | 36.4 | 0.15 | 10.4 | 10.4 | 10.4 | 10.4 | 10.4 | 10.4 | | | |
| Line 17 | 23.6 | 1.6 | 69 | 0.3 | 5.6 | 5.6 | 5.6 | 5.6 | | | | | |
| Line 22 | 0.2 | | 99.8 | | | | | | | | | | |
| Line 23 | 1.0 | | 99 | | | | | | | | | | |
| Line 24 | 76.5 | 5.2 | | | | 4.5 | 7.1 | 6.6 | | | | | |
| Line 26 | 9.5 | 73.5 | | | | 2.7 | | 3.4 | 2.8 | 5.2 | | | 2.7 |
| Line 28 | 10.7 | 82.5 | | | | | | 6.4 | | | | | |
| Line 30 | | 19.6 | | | | 20.2 | | | | 38 | | | 22.6 |
| Line 34 | | 99.9+ | | | | | | | | | | | |
| Line 37 | 7.9 | 24 | | | | 8.8 | 11.7 | 47 | | | | | |
| Line 38 | 96 | 2.9 | | | | | 0.6 | | | | | | |

While the compositions above shown are representative, it should be recognized that some variations in composition will be encountered in commercial practice. The hydrocarbon impurities may be expected to increase markedly if the cumene feed has an appreciable content of butyl benzene or of ethyl benzene. In commercial practice, the content of these materials in the cumene feed may vary considerably. The content of oxygenated impurities will vary somewhat with the conditions under which the oxidation reaction is conducted and with the degree of conversion of cumene to cumene hydroperoxide which is accomplished prior to concentration of the cumene hydroperoxide. The content of oxygenated impurities will also vary somewhat with the conditions under which the decomposition of the cumene hydroperoxide is conducted. The employment of higher temperatures in the decomposition reaction may be expected to increase the content of the oxygenated impurities in the crude product and the mesityl oxide content of the decomposition mixture increases appreciably as the quantity of acid catalyst employed in the decomposition reaction is increased.

Representative flow rates in the more significant transfer lines employed in the process are shown in the following Table II.

TABLE II

| | Parts by weight per hour |
|---|---|
| Line 1 | 242 |
| Line 4 | 58 |
| Line 9 | 214 |
| Line 19 | 0.8 |
| Line 22 | 55 |
| Line 23 | 56 |
| Line 24 | 49 |
| Line 35 | 21 |
| Line 36 | 25 |
| Line 30 | 20.5 |
| Line 31 (top) | 29 |
| Line 33 | 94 |
| Line 14 | 87 |

We claim:

1. A process for recovering substantially pure phenol and substantially pure acetone from the reaction product mixture produced by catalytically decomposing cumene hydroperoxide concentrate which is substantially free of cumene in the presence of an acid catalyst, which comprises neutralizing the reaction product and intimately mixing it with 0.25 to 3 times its weight of water in a neutralizing and washing zone, settling the resultant mixture to separate a water phase and an organic phase, fractionally distilling the water phase to separate an overhead fraction consisting predominantly of water and containing minor proportions of phenol and acetone and a bottoms fraction consisting essentially of water containing in solution salts formed during neutralization, returning the overhead fraction to the washing and neutralizing zone and rejecting the bottoms fraction from the system, fractionally distilling the organic phase to separate an overhead fraction consisting predominantly of acetone and having a substantial content of water and a bottoms fraction consisting predominantly of phenol, fractionally distilling the last named overhead fraction to separate a further overhead fraction consisting of essentially pure acetone and a bottoms fraction consisting predominantly of water and containing a minor proportion of phenol, mixing the bottoms fraction with fresh water and settling the mixture to separate an upper organic phase and a lower aqueous phase containing dissolved phenol and passing the aqueous phase into the washing and neutralizing zone.

2. A process for recovering substantially pure phenol and substantially pure acetone from the reaction product mixture produced by catalytically decomposing cumene hydroperoxide concentrate which is substantially free of cumene in the presence of an acid catalyst, which comprises neutralizing the reaction product and intimately mixing it with 0.25 to 3 times its weight of water in a neutralizing and washing zone, settling the resultant mixture to separate a water phase and an organic phase, fractionally distilling the water phase in a first distillation zone to separate an overhead fraction consisting predominantly of water and containing minor proportions of phenol and acetone and a bottoms fraction consisting essentially of water containing in solution salts formed during neutralization, returning the overhead fraction to the washing and neutralizing zone and rejecting the bottoms fraction from the system, fractionally distilling the organic phase in a second distillation zone to separate an overhead fraction consisting predominantly of acetone and having a substantial content of water and a bottoms fraction consisting predominantly of phenol, fractionally distilling the overhead fraction from the second distillation zone in a third distillation zone to separate an overhead fraction consisting of essentially pure acetone and a bottoms fraction consisting predominantly of water and containing a minor proportion of phenol, mixing the bottoms fraction from the third distillation zone with fresh water in an extraction zone and settling the mixture to separate an upper organic phase and a lower aqueous phase containing dissolved phenol and passing the aqueous phase into the washing and neutralizing zone, fractionally distilling the bottoms from the second distillation zone in a fourth distillation zone to separate a minor overhead fraction comprising water and phenol and passing the overhead fraction from the fourth distillation zone into the extraction zone.

3. A process for recovering substantially pure phenol and substantially pure acetone from the reaction product mixture produced by catalytically decomposing cumene hydroperoxide concentrate which is substantially free of cumene in the presence of an acid catalyst, which comprises neutralizing the reaction product and intimately mixing it with 0.25 to 3 times its weight of water in a neutralizing and washing zone, settling the resultant mixture to separate a water phase and an organic phase, fractionally distilling the water phase in a first distillation zone to separate an overhead fraction consisting predominantly of water and containing minor proportions of phenol and acetone and a bottoms fraction consisting essentially of water containing in solution salts formed during neutralization, returning the overhead fraction to the washing and neutralizing zone and rejecting the bottoms fraction from the system, fractionally distilling the organic phase in a second distillation zone to separate an overhead fraction consisting predominantly of acetone and having a substantial content of water and a bottoms fraction consisting predominantly of phenol, fractionally distilling the overhead fraction from the second distillation zone in a third distillation zone to separate an overhead fraction consisting of essentially pure acetone and a bottoms fraction consisting predominantly of water and containing a minor proportion of phenol, fractionally distilling the bottoms from the second distillation zone in a fourth distillation zone to separate a minor overhead fraction comprising water and phenol, mixing the bottoms fraction from the third distillation zone and the overhead fraction from the fourth distillation zone with fresh water in an extraction zone and settling the mixture to separate an upper organic phase and a lower aqueous phase containing dissolved phenol and passing the aqueous phase into the washing and neutralizing zone.

No references cited.